Figure 1:
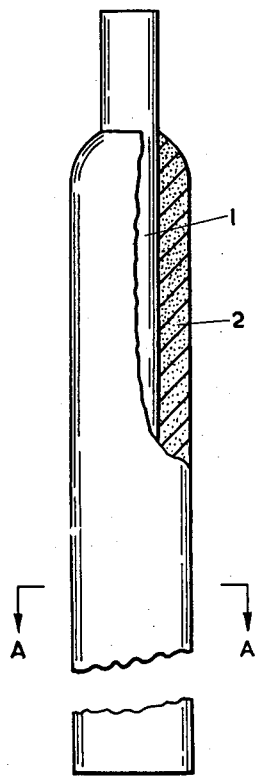

May 9, 1961  A. J. H. GRIFFITHS ET AL  2,983,632
ELECTRIC ARC WELDING ELECTRODE
Filed Nov. 22, 1957

Titania, Limestone, Iron Powder, binder and Ferro-Alloys.

Low Alloy Steel.

INVENTORS.
ARTHUR J.H.GRIFFITHS.
ARTHUR B.FIELDHOUSE.
BY *Aaron R. Townsend*
ATTORNEY

United States Patent Office 2,983,632
Patented May 9, 1961

2,983,632
ELECTRIC ARC WELDING ELECTRODE
Arthur John Henry Griffiths and Arthur Bernard Fieldhouse, Wolverhampton, England, assignors to The British Oxygen Company Limited, a British company
Filed Nov. 22, 1957, Ser. No. 698,028
Claims priority, application Great Britain Nov. 26, 1956
7 Claims. (Cl. 117—205)

The present invention relates to electric arc welding electrodes of the type having a core wire covered by a coating of material which provides a protective gas shield for the welding arc and for the weld metal and which also provides a slag covering for the weld metal.

A wide variety of coating compositions has been employed for electrodes of this type, and one type of coating which has been used successfully for the welding of steels is one which has a preponderance of limestone and fluorspar and is generally known as a lime/fluorspar or "basic" coating. While this type of coating gives excellent metallurgical results it does not give the same ease of weldability as that of a coating based on a substantial proportion of mineral titanium oxide or rutile. The stability at low open circuit voltages of electrodes with a high proportion of fluorspar included in the coating is poor and it is not always possible consistently to obtain a good weld shape on fillet welds. Further, the basic electrodes are difficult to strike and it is necessary to weld with a short arc in order to avoid porosity in the weld.

Attempts which have been made to produce a low hydrogen electrode with a baked rutile coating have in the past only succeeded where a high proportion of fluorspar is incorporated in the coating. This affects the slag flow and gives welding properties akin to those of the lime/fluorspar coating. We have developed a rutile type coated electrode which has similar welding properties to those of a normal unbaked rutile type coated electrode but is capable of depositing weld metal having a low hydrogen content.

In this newly developed rutile type coated electrode, the core wire is coated with a high temperature baked coating of low hydrogen content and rutile type welding characteristics containing as principal ingredients:

| | Parts by weight |
|---|---|
| Titania | 30–60 |
| Limestone | 10–40 | and not less than 5 parts by weight of ferro-alloy selected from the group consisting of ferro-manganese, ferro-silicon and ferro-titanium, the maximum amounts of ferro-manganese, ferro-silicon and ferro-titanium being respectively 15, 15 and 10 parts by weight.

It should be understood that these components may be added in their commercially pure form or may be added as mineral ingredients e.g. for titania the mineral rutile could be employed. Up to 10 parts by weight of fluorspar may be included. The materials are selected so that covering applied to the core wire has a low hydrogen content particularly in the form of water of crystallization. The coated electrode is subjected to a high temperature baking treatment as described below.

These newly developed electrodes may be manufactured by extruding onto a straight mild steel wire a paste comprising the ingredients specified in the penultimate paragraph within the limits stated. The ingredients are previously mixed thoroughly in powder form and converted to a paste in a suitable mixer by additions of limited amounts of alkali silicates or other bonding agents. After extrusion onto the core wire the electrode coverings are dried by a suitable means. The electrodes are finally baked in a furnace at a temperature of at least 300° C. and preferably at 350 to 550° C. to expel water with consequent reduction of the hydrogen content of the deposited weld metal.

Electrodes produced in this manner are low hydrogen electrodes having a weld metal diffusible-hydrogen content of below 5.0 ml. per 100 grams of weld metal and which also retain the excellent weldability of rutile type coated electrodes. They possess good arc stability at low open circuit voltages, good arc striking properties, decreased sensitivity to arc length porosity since the electrodes can be used with a touch welding technique and produce less fluoride fume than the conventional low hydrogen basic electrode.

It will be noted that the electrode coating includes, in addition to the main slag forming ingredient, titania, a quantity of limestone which will decompose at the temperature of operation to form carbon-dioxide, and ferroalloy having a powerful deoxidising action. The materials are selected so that the covering applied to the core wire has a low hydrogen content particularly in the form of water of crystallization. The use of such a covering coupled with the high temperature baking step referred to above results in the production of electrodes particularly adapted to deposit low hydrogen content weld metal.

A particular example of electrode coating which can be applied to a mild steel core wire in this way to produce a manual electrode for welding mild steel comprises the following ingredients:

| | Parts by weight |
|---|---|
| Titania | 45 |
| Limestone | 35 |
| Fluorspar | 5 |
| Ferro-manganese | 5 |
| Ferro-silicon | 5 |
| Ferro-titanium | 5 |

The coating may also include small proportions of other fluxing ingredients in order to adjust the slag fluidity.

It is known that the rate of metal deposition can be increased by inclusion of iron powder in the coating of an electrode and an increase in the coating thickness. This enables higher welding currents to be used because the iron powder gives increased conductivity to the coating and allows it to carry part of the welding current. The iron powder in the coating also increases the amount of metal available for deposition. When this principle is applied to a normal rutile type coated electrode it is possible to attain high speeds of welding in the flat and horizontal-vertical positions. The ductility of the weld metal, however, is poor in the as-welded condition and even when stress-relieved is not good. With iron powder included in our newly developed electrode coating, good ductility is obtained even in the as-welded condition and all the advantages of a rutile type coated electrode are retained.

According to the present invention therefore, iron powder, in an amount of from 20 to 50 parts by weight, is included in the coating of the newly developed electrode described above.

In a further flux coated electric arc welding electrode in accordance with the present invention, a core wire of steel is provided with a high temperature baked coating of low hydrogen content and rutile type welding characteristics containing as principal ingredients:

| | Parts by weight |
|---|---|
| Titania | 30–50 |
| Limestone | 20–40 |
| Iron powder | 20–50 | and not less than 5 parts by weight of ferro-alloy selected from the group consisting of ferro-manganese, ferro-silicon, and ferro-aluminium, the maximum amounts of ferro-manganese, ferro-silicon and ferro-aluminium being respectively 10, 15 and 10 parts by weight, the ingredients comprising only materials which before the high temperature baking have a low hydrogen content particularly in the form of water of crystallization.

The core wire may be of mild steel or of low alloy steel. Up to 10 parts by weight of fluorspar may be included in the coating.

Figure 2:
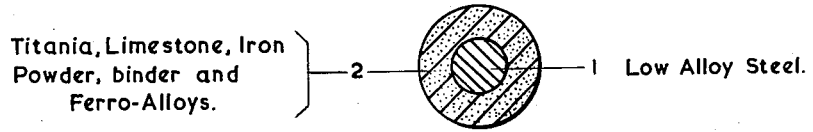

The accompanying drawing illustrates a typical flux coated electric arc welding electrode in accordance with the present invention. Figure 1 shows a side elevational view partly in cross-section, and Figure 2 shows a cross-sectional view of Figure 1 taken on the line A—A. In these figures, the welding electrode is shown as having a steel core wire 1 which is surrounded by a coating 2. This coating includes titania, limestone, iron powder, binder and ferro-alloys within the ranges specified above, and has been baked on the electrode at high temperature.

The thickness of coating employed will vary with the application but will in general be up to three times the normal coating thickness, e.g. the normal outside diameter for a coated 8 S.W.G electrode is 0.220 inch and the invention, with iron powder in the coating, therefore contemplates outside diameters of up to .340 inch for an 8 S.W.G. (.160 inch diameter) electrode wire and pro-rata for other sizes. It is to be understood, however, that the covering thickness is not limited by this example.

A particular example of an electrode coating in accordance with the invention and including iron powder is as follows:

| | Parts by weight |
|---|---|
| Titania | 30 |
| Limestone | 20 |
| Fuorspar | 5 |
| Ferro-manganese | 5 |
| Ferro-silicon | 5 |
| Ferro-aluminium | 5 |
| Iron powder | 30 |

An electrode with a coating in accordance with the present invention is also suitable with the inclusion of iron powder for use for special purposes e.g. for welding low alloy creep resisting steels or for hardfacing. In such instances it is necessary to add suitable metals or alloys to the coating in order to produce a weld metal giving the required metallurgical or physical properties or having the correct weld metal composition. The electrode coatings specified above could also be employed for this purpose with or without alloy additions but using core wires of alloy composition.

We claim:

1. A flux coated electric arc welding electrode comprising a core wire of low alloy steel, and a high temperature baked coating of low hydrogen content and rutile type welding characteristics on the core wire containing as principal ingredients:

| | Parts by weight |
|---|---|
| Titania | 30 to 40 |
| Limestone | 20 to 40 |
| Iron powder | 20 to 50 | and not less than 5 parts by weight of ferro-alloy selected from the group consisting of ferro-manganese, ferro-silicon, and ferro-aluminium the maximum amounts of ferro-manganese, ferro-silicon and ferro-aluminium respectively being 10, 15 and 10 parts by weight; the ingredients comprising only materials which before the high temperature baking have a low hydrogen content particularly in the form of water of crystallization.

2. A flux coated electric arc welding electrode in accordance with claim 1, wherein the high temperature baked coating includes up to 10 parts by weight of fluorspar.

3. A flux coated electric arc welding electrode comprising a core wire of mild steel, and a high temperature baked coating of low hydrogen content and rutile type welding characteristics on the core wire containing as principal ingredients:

| | Parts by weight |
|---|---|
| Titania | 30 to 50 |
| Limestone | 20 to 40 |
| Iron powder | 20 to 50 | and not less than 5 parts by weight of ferro-alloy selected from the group consisting of ferro-manganese, ferro-silicon, and ferro-aluminium the maximum amounts of ferro-manganese, ferro-silicon and ferro-aluminium respectively being 10, 15 and 10 parts by weight; the ingredients comprising only materials which before the high temperature baking have a low hydrogen content particularly in the form of water of crystallization.

4. A flux coated electric arc welding electrode in accordance with claim 3, wherein the high temperature baked coating includes up to 10 parts by weight of fluorspar.

5. A flux coated electric arc welding electrode in accordance with claim 3, characterised in that the coating comprises the following ingredients:

| | Parts by weight |
|---|---|
| Titania | 30 |
| Limestone | 20 |
| Fluorspar | 5 |
| Ferro-manganese | 5 |
| Ferro-silicon | 5 |
| Ferro-aluminium | 5 |
| Iron powder | 30 |

6. A flux coated electric arc welding electrode comprising a core wire of mild steel, and a high temperature baked coating of low hydrogen content and rutile type welding characteristics on the core wire containing as principal ingredients:

| | Parts by weight |
|---|---|
| Titania | 30 to 60 |
| Limestone | 10 to 40 |
| Ferro-titanium | 5 to 10 |
| and | |
| Iron powder | 20 to 50 | the ingredients comprising only materials which before the high temperature baking have a low hydrogen content particularly in the form of water of crystallization.

7. A flux coated electric arc welding electrode comprising a core wire of low alloy steel, and a high temperature baked coating of low hydrogen content and rutile type welding characteristics on the core wire containing as principal ingredients:

| | Parts by weight |
|---|---|
| Titania | 30 to 60 |
| Limestone | 10 to 40 |
| Ferro-titanium | 5 to 10 |
| and | |
| Iron powder | 20 to 50 | the ingredients comprising only materials which before the high temperature baking have a low hydrogen content particularly in the form of water of crystallization.

References Cited in the file of this patent

UNITED STATES PATENTS

| | | |
|---|---|---|
| 2,422,489 | Kihlgren | June 17, 1947 |
| 2,451,655 | Bienfait et al. | Oct. 19, 1948 |
| 2,490,179 | Vander Willigen et al. | Dec. 6, 1949 |
| 2,491,593 | Vander Willigen | Dec. 20, 1949 |
| 2,499,827 | Kihlgren | Mar. 7, 1950 |
| 2,544,334 | Linnert | Mar. 6, 1951 |
| 2,730,465 | Vander Willigen | Jan. 10, 1956 |
| 2,789,925 | Jessen | Apr. 23, 1957 |
| 2,824,817 | Shutt | Feb. 25, 1958 |
| 2,861,013 | Sarazin et al. | Nov. 18, 1958 |

FOREIGN PATENTS

| | | |
|---|---|---|
| 1,083,270 | France | June 23, 1954 |
| 81,377 | Norway | Feb. 23, 1953 |